No. 625,683. Patented May 23, 1899.
J. JULIEN.
ELECTRODE FOR SECONDARY BATTERIES.
(Application filed Oct. 24, 1896.)
(No Model.)
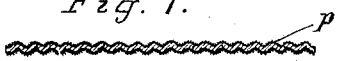
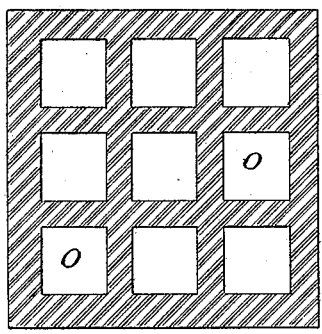
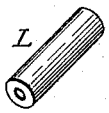
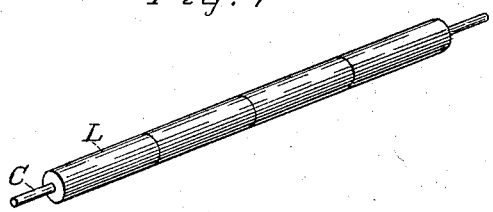
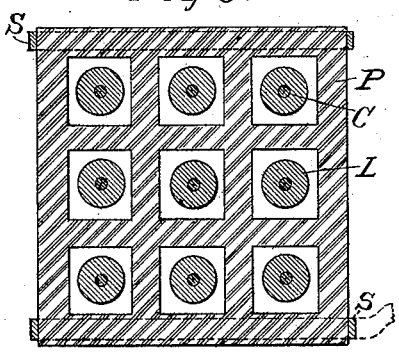
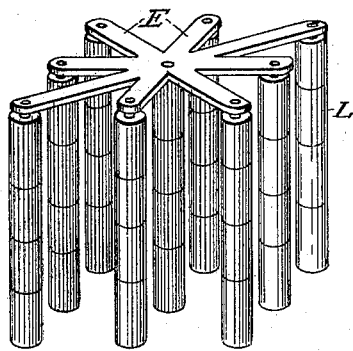
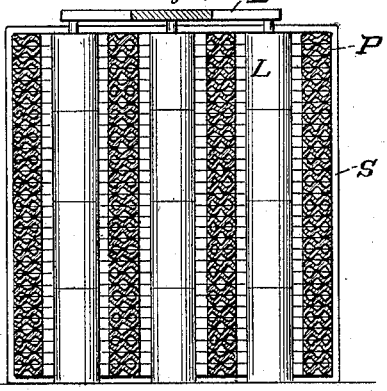
WITNESSES:
M. V. Bidgood
Fred'k Handrich
INVENTOR
Jules Julien
BY
[signature]
ATTORNEYS
THE NORRIS PETERS CO., PHOTO-LITHO., WASHINGTON, D. C.

UNITED STATES PATENT OFFICE.

JULES JULIEN, OF BRUSSELS, BELGIUM.

ELECTRODE FOR SECONDARY BATTERIES.

SPECIFICATION forming part of Letters Patent No. 625,683, dated May 23, 1899.

Application filed October 24, 1896. Serial No. 609,939. (No model.)

*To all whom it may concern:*

Be it known that I, JULES JULIEN, engineer, a subject of the King of Belgium, residing at Brussels, in the Kingdom of Belgium, have invented a new and useful Electrode for Secondary Batteries, (for which patents have been obtained in Belgium, dated August 7, 1896, No. 122,903; in France, dated September 25, 1896, No. 247,455, and in Great Britain, dated October 3, 1896, No. 21,956,) of which the following is a specification.

The electrode which forms the subject of my present invention is intended for use in secondary batteries of the Planté type, wherein the negative electrode has the deposit of peroxid "formed" therein mainly or wholly by the natural process of charging.

The object of my invention is to produce a negative electrode of this nature of very great capacity and yet of great strength and durability. It has been proposed to form the negative electrode of a secondary cell of a series of superposed plates with openings therein, forming chambers to receive the positive electrodes, the latter being in the form of flat plates. This construction, while giving a large surface, involves the exposure to the disintegrating and buckling effects of the electrolytic actions in the cell of the large flat surfaces forming the walls of the openings, due to the use of large flat plates for the positive electrodes, which necessitates a similar shape for the openings. On the other hand, if the positive electrode and the opening in the negative plate be made shorter the capacity is correspondingly diminished. I overcome this difficulty by making the holes in the negative plates in such a manner as to leave intersecting walls crossing one another about at right angles, so as to form a reticulated structure, exposing more surface than would be given by the long narrow openings, and at the same time giving a strongly-braced and self-supporting construction, nowhere exposing large flat surfaces to the electrolytic action. It has also been proposed to arrange flat negative electrode-plates in a cell in such a manner as to form a series of chambers for the reception of the positive electrodes and also forming intersecting walls; but in this case the plates only mutually support one another by contact, so that a solid substantially integral structure, such as is produced by forming the series of openings in superposed plates, so that each plate has a series of openings and intersecting walls, is not presented.

In the accompanying drawings, Figure 1 is a transverse section, and Fig. 2 a plan view, of one sheet of lead for the negative electrode. Fig. 3 is a perspective view of a cylinder of plumbic material forming part of the positive electrode. Fig. 4 shows several such cylinders threaded on their conducting-rod. Fig. 5 shows a group of pencils of plumbic material forming the positive electrode. Figs. 6 and 7 are respectively horizontal and vertical sections of the two electrodes as they are arranged to form an accumulator.

The negative element or electrode is formed by the piling or superposition of a large number of sheets P, of rolled lead or lead alloys, the external contour being square, as shown, or any suitable shape. Each plate has formed therein a series of holes O, preferably square, leaving intersecting walls crossing one another, as shown, so as to give a reticulated structure. When these plates are superimposed, as shown in Fig. 7, their openings or holes O form a series of vertical chambers, and the intersecting walls present a large amount of surface and at the same time mutually support and brace one another. The plates P are diagonally grooved or corrugated, as shown in Figs. 1, 2, and 6, in order to form narrow interstices between the superposed sheets to give access to the electrolyte for the formation of peroxid. This latter action may be accelerated by dipping the lead plates before or after being placed in a pile in a fluid paste of oxid of lead salts and preferably in a fluid paste of active material obtained from worn-out accumulators, thus allowing the latter to be advantageously utilized. For this purpose the waste active material is finely pulverized, with the addition of water, in a suitable apparatus until a homogeneous bath is obtained, into which the channeled plates are dipped in order to give them a thin coating of this material, as shown at $p$ in Fig. 1. All the plates or sheets P of the electrode are then soldered by their edges to strips or bands S of lead, (see Figs. 6 and 7,) surrounding the pile of plates and connected with one another and with a terminal, with which all of the plates are thus electrically connected, forming an electrode or element having a maximum surface and capacity and substantially perfect unalterability, because whatever be the tendency to mechanical deformation produced by electrolytic action on the plates individually it will always be annulled by the compactness of the construction, which always maintains the peroxid in intimate contact with the superposed plates, seeing that it is impossible for it to separate itself therefrom by reason of the piling together of the plates, so that this construction dispenses with any frames or other like means for maintaining the elements in position in the electrolyte. In connection with such a negative electrode I prefer to use a positive electrode formed of a series of pencils adapted to be received in the several vertical chambers formed by the openings O, as aforesaid. These pencils are formed by molding litharge or other plumbic compound in paste or in a state of fusion into the form of small cylinders or prisms L, perforated along their axes. These tubular bodies are well dried after being molded and then, as shown in Figs. 3 and 4, are strung with friction on conducting-rods C of suitable length and formed of a metal, such as an alloy of lead and antimony, which is not affected by the electrolyte under the conditions in question. A number of pencils L are united to form a single positive electrode by attaching their rods C to a common conducting-frame, as shown in Figs. 6 and 7, and the electrode so formed is inserted with its several pencils L in the respective vertical chambers formed by openings O in the negative electrode. This gives a very compact pair of elements requiring only a minimum volume of electrolyte. Moreover, the pencils being round and equally exposed on all sides and the openings in the negative element being square and also equally exposed on all sides, the electrolytic action is rendered very uniform and liability of deformation decreased. By dividing the plates up by a series of small square openings in such a manner as to leave intersecting walls or partitions I avoid large flat unsupported surfaces, while securing the maximum amount of total active surface. The several intersecting walls or partitions form part of the active surface of the electrode and at the same time mutually support and brace one another, giving a very stable and durable construction.

The grooves or corrugations in the sheets or plates P are made diagonal, as indicated in Figs. 2 and 6, and the corrugations cross one another in the alternate plates, so as to insure free access of electrolyte from all sides. With plates corrugated in a direction parallel to two of the sides access of the electrolyte from these sides would be practically prevented.

Having thus described my invention, the following is what I claim as new therein and desire to secure by Letters Patent:

1. In a Planté accumulator, the combination of a negative electrode formed by the horizontal superposition of a series of thin finely grooved or corrugated rolled sheets of lead or lead alloys, having any suitable contours, the bands of lead surrounding the block of superposed plates and electrically connecting them together, such electrode being provided with a series of vertical channels or passages, and a positive electrode comprising a corresponding number of pencils of positive material connected in a group, said pencils being inserted respectively in said channels, with the object of reducing to a minimum the space occupied by the battery and the quantity of electrolyte in which it is immersed, substantially as set forth.

2. In a Planté accumulator, the combination of a negative electrode formed by the horizontal superposition of a series of thin diagonally grooved or corrugated rolled sheets of lead or lead alloys, having any suitable contours, the bands of lead surrounding the block of superposed plates and electrically connecting them together, such electrode being provided with a series of vertical channels or passages, and a positive electrode comprising a corresponding number of pencils of positive material connected in a group, said pencils being inserted respectively in said channels, with the object of reducing to a minimum the space occupied by the battery and the quantity of electrolyte in which it is immersed, substantially as set forth.

3. In a Planté accumulator, a negative electrode formed of a series of superposed corrugated sheets of suitable metal, having the corrugations running diagonally to the sides thereof, and having active material applied on both sides thereof, while leaving narrow diagonal interstices for the access of the electrolyte and bands for connecting said sheets together.

JULES JULIEN.

Witnesses:
AUG. JOERISSEN,
E. PARETTE.